United States Patent [19]

MacMinn et al.

[11] Patent Number: 4,933,621
[45] Date of Patent: Jun. 12, 1990

[54] CURRENT CHOPPING STRATEGY FOR SWITCHED RELUCTANCE MACHINES

[75] Inventors: Stephen R. MacMinn, Schenectady; Fred G. Turnbull, Scotia, both of N.Y.

[73] Assignee: General Electric Company, Schenectady, N.Y.

[21] Appl. No.: 350,884

[22] Filed: May 12, 1989

[51] Int. Cl.⁵ .............................................. H02P 8/00
[52] U.S. Cl. ...................................... 318/696; 363/98; 363/132; 363/64; 318/701; 318/685; 312/163
[58] Field of Search ........................ 318/696, 685, 701; 310/163; 363/98, 96, 97, 132, 137, 64

[56] References Cited

U.S. PATENT DOCUMENTS

| | | | |
|---|---|---|---|
| 4,325,095 | 4/1982 | Hart | 361/23 |
| 4,424,557 | 1/1984 | Steigherwald | 363/98 |
| 4,672,521 | 6/1987 | Rienes | 363/41 |
| 4,682,093 | 7/1987 | Murphy et al. | 318/701 |
| 4,684,867 | 8/1987 | Miller | 318/701 |
| 4,739,240 | 4/1988 | MacMinn et al. | 318/696 |
| 4,835,408 | 5/1989 | Ray et al. | 307/24 |

OTHER PUBLICATIONS

Miller, T. J. E., Switched Reluctance Motor Drives, Intertec Communications, Inc., 1988, pp. 53–62.

*Primary Examiner*—William M. Shoop, Jr.
*Assistant Examiner*—Saul M. Bergmann
*Attorney, Agent, or Firm*—Jill M. Breedlove; James C. Davis, Jr.; Marvin Snyder

[57] ABSTRACT

A method and apparatus are provided for controlling the switching devices in a switched reluctance machine bridge inverter having at least two switching devices per phase. One switching device is used for hysteresis band current chopping to regulate phase current magnitude, while the other switching device, in combination with a flyback diode, provides a circulating path for phase current. Alternatively, current chopping and circulating are alternated between both switching devices during each conduction interval of the corresponding machine phase. Ripple current is decreased, thereby reducing the required size of the DC link capacitor. Switching losses are also reduced.

10 Claims, 4 Drawing Sheets

CURRENT CHOPPING STRATEGY FOR SWITCHED RELUCTANCE MACHINES

FIELD OF THE INVENTION

The present invention relates generally to switching control and current regulation in bridge inverters. More particularly, this invention relates to a method and apparatus for controlling the switching devices and regulating current in a switched reluctance machine bridge inverter.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative, or braking, torque. In a SRM, torque direction is independent of current direction. Therefore, in contrast to most other brushless machines which require bidirectional phase currents, a SRM power inverter can be configured to enable current flow in only one direction through a phase winding. Such an inverter generally employs one or more switching devices, such as transistors or thyristors, in series with each machine phase winding. Advantageously, the switching devices prevent "shoot-through" current paths. Exemplary SRM converters are illustrated in commonly assigned U.S. Pat. No. 4,684,867, issued to T. J. E. Miller on Aug. 4, 1987, which is hereby incorporated by reference.

At relatively low and medium speeds, current magnitude regulation in SRMs is typically achieved by hysteresis band current chopping. In a SRM drive employing two switching devices per phase, such a current chopping scheme involves generating a commanded reference current waveform which has predetermined upper and lower hysteresis band limits to which the phase currents are continuously compared. At the start of a conduction interval for one phase (i.e., when a phase is excited for torque production), the switching devices in series with the corresponding phase winding are simultaneously switched on. With both switches thus conductive, current from the DC source builds in the phase winding until the upper limit of the hysteresis band is reached. At that point, both switching devices are turned off. Flyback or return diodes coupled to the phase winding provide a current path back to the DC source. When the phase current decreases to the lower limit of the hysteresis band, the switching devices are switched on again, and the process repeats. This process is commonly referred to as pulse width modulation (PWM) or current chopping. Such a hysteresis band current chopping strategy is described in commonly assigned U.S. Pat. No. 4,739,240, issued to S. R. MacMinn and P. M. Szczesny on Apr. 19, 1988, which is hereby incorporated by reference.

Disadvantageously, high frequency current chopping results in a ripple current component on the DC source bus which must be removed by the DC bus filter capacitor. The size and weight of the filter capacitor are directly proportional to the ripple current rating thereof. Therefore, in order to reduce the volume and weight of a SRM drive, it is desirable to reduce the maximum allowable ripple current. Further, it is desirable to reduce switching losses and hence junction temperatures of the switching devices. In particular, since power is dissipated in a switching device each time the device transitions between a conductive and a nonconductive state, switching losses can be reduced by decreasing the chopping frequency.

OBJECTS OF THE INVENTION

Accordingly, it is an object of the present invention to provide a method and apparatus for controlling the switching devices in a SRM bridge inverter in order to suppress ripple current and thereby limit the size of the filter capacitor required at the input of the inverter.

Another object of this invention is to provide a method and apparatus for controlling the switching devices in a SRM bridge inverter in a manner to limit switching frequency and thus reduces switching losses.

SUMMARY OF THE INVENTION

The foregoing and other objects are achieved in a new method and apparatus for controlling switching devices and regulating current in a SRM bridge inverter having at least two switching devices per phase leg connected in series with the corresponding machine phase winding. Each inverter phase leg further includes an upper flyback diode and a lower flyback diode corresponding to the upper and lower switching devices, respectively, each combination of a switching device and the corresponding flyback diode providing a path for circulating phase current. In general, phase current magnitude is limited by hysteresis band chopping. For an inverter having two switching devices connected in series with each machine phase winding, both switching devices are turned on at the start of the conduction interval for that phase. Current from the DC source builds in the respective phase winding until it reaches the upper hysteresis band limit. At that point, a preselected one of the switching devices is turned off, while the second one remains on. The phase current circulates through the second respective switching device and the corresponding flyback diode so that no current is returned to the DC source. When the phase current decays to the lower hysteresis band limit, the preselected one of the switching devices is turned on again, and the process repeats. In the preferred embodiment of the present invention, phase current chopping is alternated between the upper and lower switching devices, respectively, of each respective phase during each conduction interval thereof.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
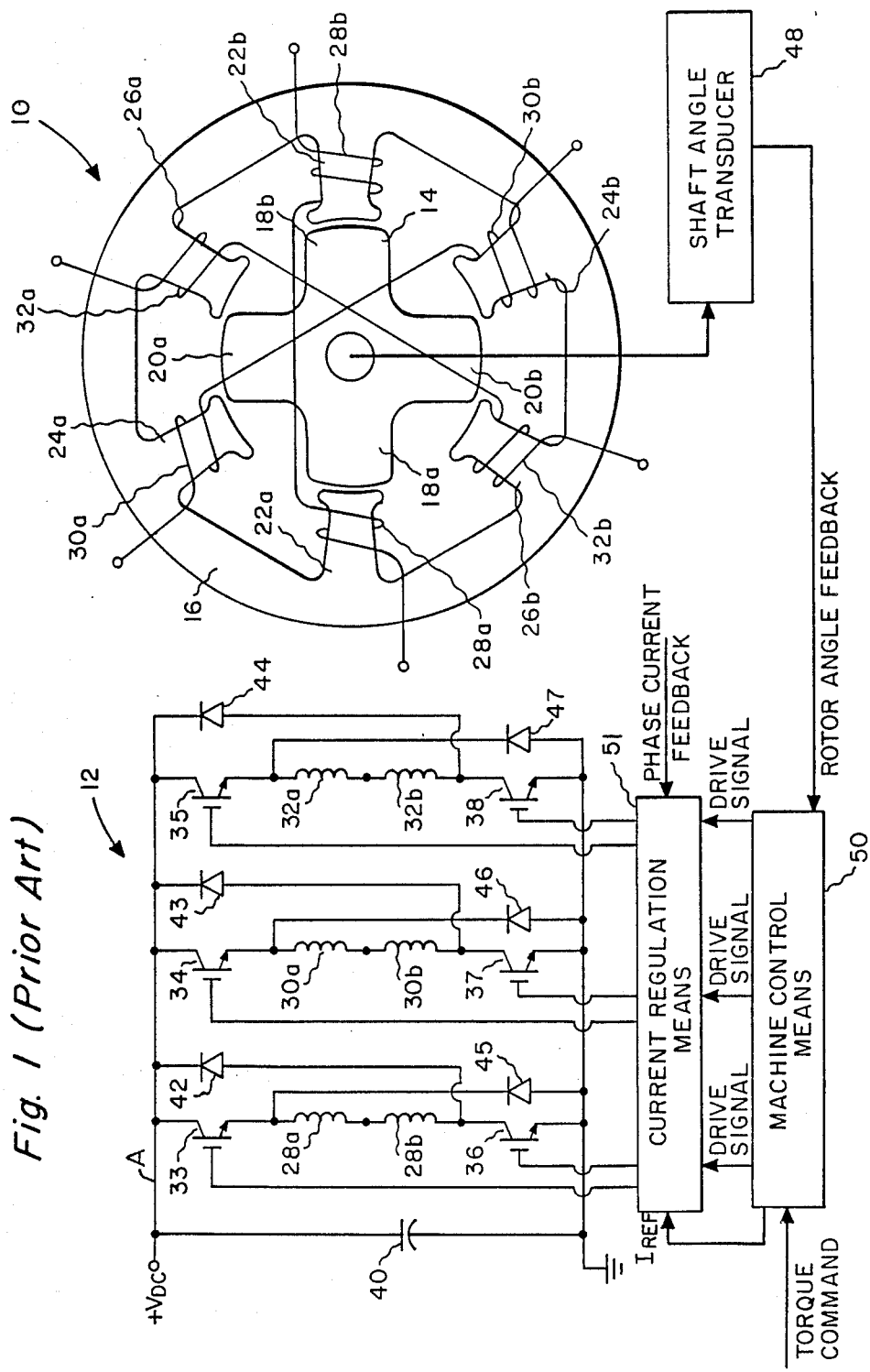
FIG. 1 is a schematic diagram of a conventional SRM drive.

FIG. 1 shows a conventional switched reluctance machine drive configuration. By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or in parallel to form a machine phase winding. As illustrated in FIG. 1, the stator pole windings comprising each companion pair 28-28b, 30-30b and 32-32b, respectively, are connected in series with each other and with an upper current switching device 33, 34 and 35, respectively, and with a lower current switching device 36, 37 and 38, respectively. The upper and lower switching devices each comprise an insulated gate bipolar transistor (IGT), but other suitable current switching devices may be used; for example, field effect transistors (FETs), gate turn-off thyristors (GTOs) or bipolar junction transistors (BJTs). Each phase winding is further coupled to a DC source, such as a battery or a rectified AC source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the DC source. Each series combination of a phase winding with two corresponding switching devices and two flyback diodes comprises one phase leg of inverter 12. The inverter phase legs are connected in parallel to each other and are driven by the DC source, which impresses a DC voltage $V_{DC}$ across the parallel inverter phase legs. Capacitance 40 is provided for filtering transient voltages from the DC source and for supplying ripple current to the inverter.

Typically, as shown in FIG. 1, a shaft angle transducer 48, e.g. an encoder or a resolver, is coupled to rotor 14 for providing rotor angle feedback signals to a machine control means 50. An operator command, such as a torque command, is also generally inputted to control means 50. Phase current feedback signals are supplied to a current regulation means 51 which receives phase current feedback signals from current sensors (not shown). Suitable current sensors are well-known in the art, such as: Hall effect current sensors; sensing resistors; sensing transformers; and current sensing transistors, such as those sold under the trademark SENSE-FET by Motorola Corporation or those sold under the trademark HEXSense by International Rectifier. Additionally, control means 50 provides a commanded reference current waveform $I_{REF}$ to current regulation means 51, to be hereinafter described. In well-known fashion, such as described in U.S. Pat. No. 4,739,240, cited hereinabove, the control means provides firing signals to inverter 12 for energizing the machine phase windings in a predetermined sequence.

Figure 2:
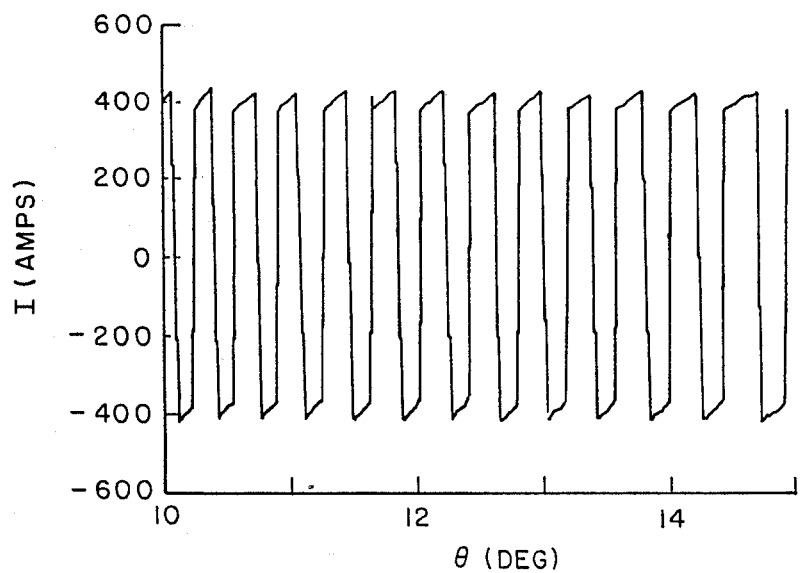
FIG. 2 is a graphical representation of the DC link ripple current waveform in wire A of the SRM drive of FIG. 1.

As described hereinabove, current regulation in a conventional SRM drive at relatively low and medium speeds is achieved by a hysteresis band current chopping strategy in which current magnitude in each phase is maintained within a hysteresis band of the commanded reference current waveform. Disadvantageously, current chopping by the switching devices results in a ripple current which must be smoothed by the filter capacitor 40. Capacitor size and cost increase with the required ripple current rating. FIG. 2 graphically illustrates a typical DC link ripple current waveform measured in wire A for the SRM drive of FIG. 1. When both switching devices of a particular phase are nonconductive, DC link ripple current is positive; and, when one switching device is nonconductive, DC link ripple current is negative.

Figure 3:
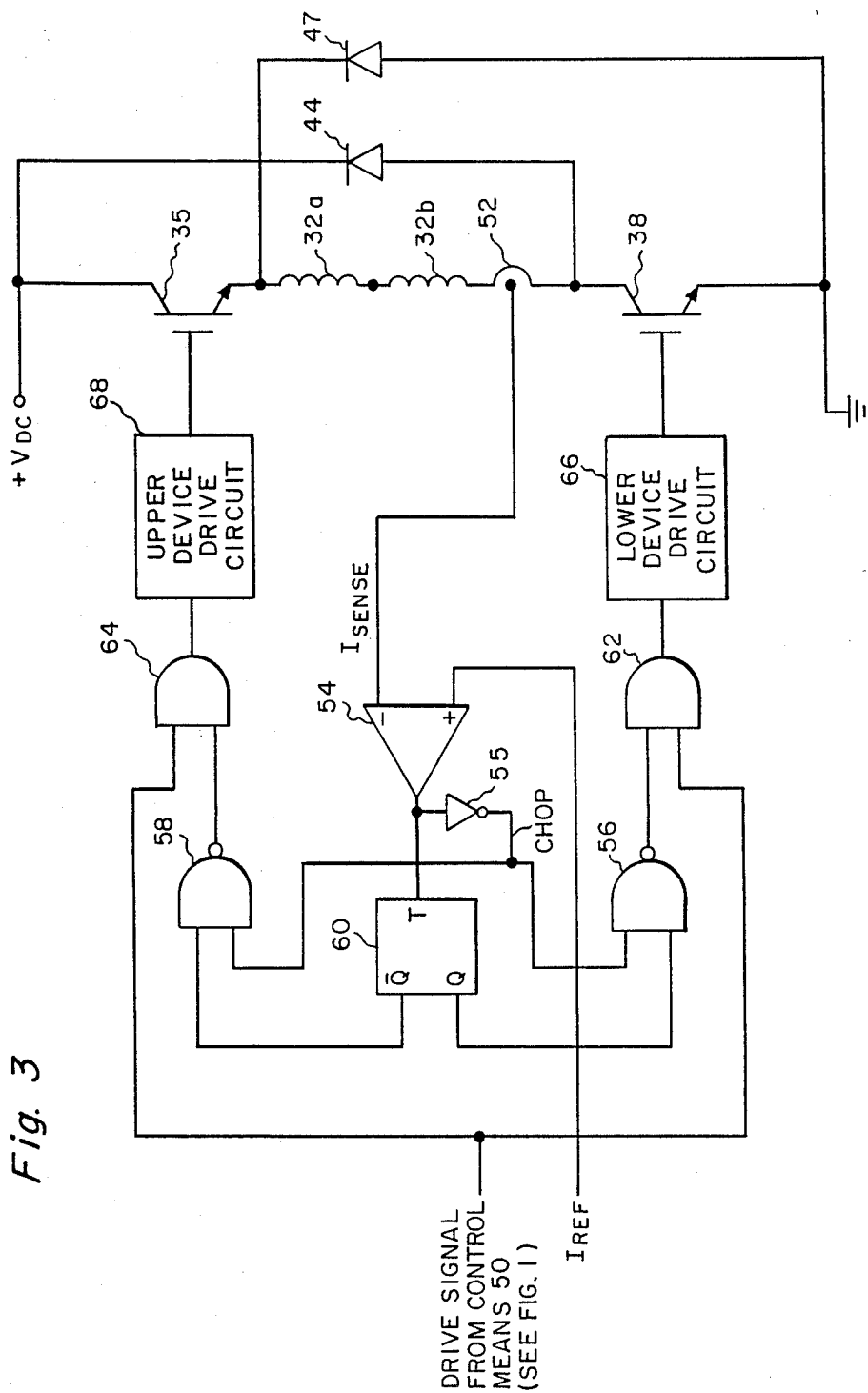
FIG. 3 is a schematic diagram of the preferred embodiment of the control system of the present invention.

In accordance with the present invention, a new and improved method for controlling the switching devices of a SRM inverter is provided to regulate current in a SRM drive. Although the control method is described with reference to a SRM inverter having two switching devices per phase, such as that of FIG. 1, it is to be understood that the principles of the present invention apply equally to SRM drives employing more than two switching devices per inverter phase leg. FIG. 3 schematically illustrates a preferred embodiment of the switching control circuitry of the present invention. Since the control circuitry for each phase is identical, FIG. 3 shows that of one phase only. In this regard, operation will be described hereinafter with reference to one phase only.

As illustrated in FIG. 3, a current sensor 52, such as one of those hereinabove described, is coupled to the phase winding comprising series-connected stator pole windings 32a and 32b. A signal $I_{SENSE}$ proportional to the sensed phase current is produced by current sensor 52 and is supplied to the inverting input of a hysteresis comparator 54, such as an LM311 manufactured by National Semiconductor Corporation. A commanded reference current waveform $I_{REF}$ is generated by a reference waveform generator, such as a function generator (not shown), and is supplied to the noninverting input of a comparator 54. The output of comparator 54 is coupled to an inverter 55 and to one input of each of two two-input NAND gates 56 and 58. The output signal of comparator 54 also clocks a T (toggle) flip-flop 60 which is triggered by a falling or negative edge of the output signal from comparator 54. Flip-flop 60 generates complementary logic level output signals at Q and $\overline{Q}$. The output signal at Q is applied to the second input of NAND gate 56, and the complementary output signal at $\overline{Q}$ is provided to the second input of NAND gate 58. The outputs of NAND gates 56 and 58, respectively, are coupled to one input of each of two two-input AND gates 62 and 64, respectively. The other input to each AND gate 62 and 64, respectively, is fulfilled by a drive signal supplied by control means 50. The outputs of AND gates 62 and 64, respectively, are coupled to a lower device drive circuit 66 and an upper device drive circuit 68, respectively. Suitable device drive circuits are well-known in the art, such as the IR2110 bridge drivers manufactured by International Rectifier.

In operation, when the sensed phase current, represented by current $I_{SENSE}$, is less than the lower limit of the hysteresis band, comparator 54 produces a high logic level signal. Otherwise, if current $I_{SENSE}$ rises above the upper limit of the hysteresis band, then comparator 54 produces a low logic level signal. The comparator output signal is supplied to inverter 55 and T flip-flop 60. The output signal produced by inverter 55 is the CHOP signal. In particular, when CHOP is a high logic level signal, phase current chopping is indicated. T flip-flop 60 determines which of the two switching devices 35 and 38 will be used for current chopping at any given time. For example, at the start of the conduction interval of the machine phase comprising stator pole windings 32a and 32b, upper and lower switching devices 35 and 38, respectively, are turned on. Current builds in the machine phase winding, and when the sensed phase current exceeds the upper limit of the hysteresis band, the output signal of comparator 54 makes a transition from a high logic level to a low logic level. The toggle flip-flop is thus triggered by the falling edge of the output signal of comparator 54.

For example, if the output Q of T flip-flop 60 is at a high logic level signal indicating that lower switching device 38 was last used for chopping, and current $I_{SENSE}$ rises above the upper limit of the hysteresis band, then the output signal of comparator 54 makes a transition from a high to a low logic level. T flip-flop 60 is triggered by the falling edge of the output signal from comparator 54 so that the output signal at Q becomes low and the output signal at $\overline{Q}$ becomes high. The low level output signal from comparator 54 is also supplied to inverter 55, causing its output signal CHOP to become high. The high logic level CHOP signal from inverter 55 is provided to NAND gates 56 and 58. Since the output signal at $\overline{Q}$ from T flip-flop 60 supplied to NAND gate 58 is also high, the output signal therefrom is a low logic level. This low output signal from NAND gate 58 is inputted to an AND gate 64, causing a low output signal therefrom which is supplied to upper device drive circuit 68, thus turning off upper switching device 35. However, lower switching device 38 remains conductive while upper switching device 35 is nonconductive. That is, the logic level signal at output Q of T flip-flop 60 is low, thus enabling NAND gate 56. The high output signal from NAND gate 56 is suppled to AND gate 62. Since the drive signal from control means 50 to AND gate 62 is also high during the conduction interval of the respective machine phase, the output signal from AND gate 62 is high, so that lower switching device 38 remains conductive. In this way, lower switching device 38 and diode 47 comprise a path for circulation of phase current while switching device 35 is nonconductive. The drive system remains in this state until current $I_{SENSE}$ decreases below the lower hysteresis band limit, at whiCh time the output signal from comparator 54 becomes low. The CHOP signal, therefore, becomes low, causing the output signals of NAND gates 56 and 58 to become high. Since the drive signal supplied to these NAND gates from control means 50 is also high during the conduction interval of the respective machine phase, switching device 35 is again turned on and switching device 38 is also turned on. The hereinabove described cycle repeats during the conduction interval of the respective machine phase, with the current chopping function alternating between the upper and lower switching devices. At the end of the conduction interval, both switching devices 35 and 38 are turned off, and current flows through diodes 44 and 47 back to the DC source. Hence, at this commutation point, there is approximately a voltage $-V_{DC}$ across the phase winding which causes the phase current to decrease quickly to zero.

Figure 4:
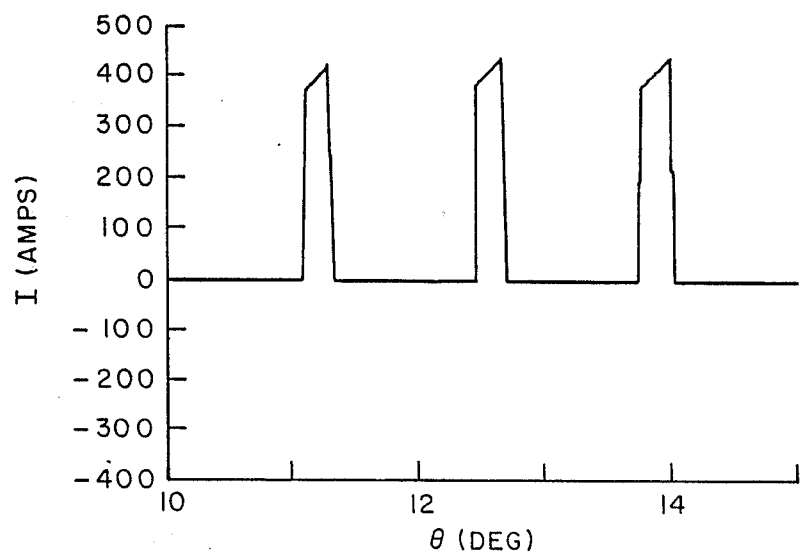
FIG. 4 is a graphical representation of the DC link ripple current waveform for a SRM drive employing the control system of the present invention.

FIG. 4 graphically illustrates a DC link ripple current waveform for a SRM drive employing the current chopping strategy of the present invention. When both switching devices are conductive, DC link ripple current is positive; and, when one switching device is nonconductive, DC link ripple current is zero. As compared with the conventional current chopping strategy for which the ripple current waveform is illustrated in FIG. 2, the PWM chopping frequency is substantially lower, and there is a reduction of over 65% in ripple current. Therefore, the size of capacitor 40 can be advantageously decreased.

Figure 5:
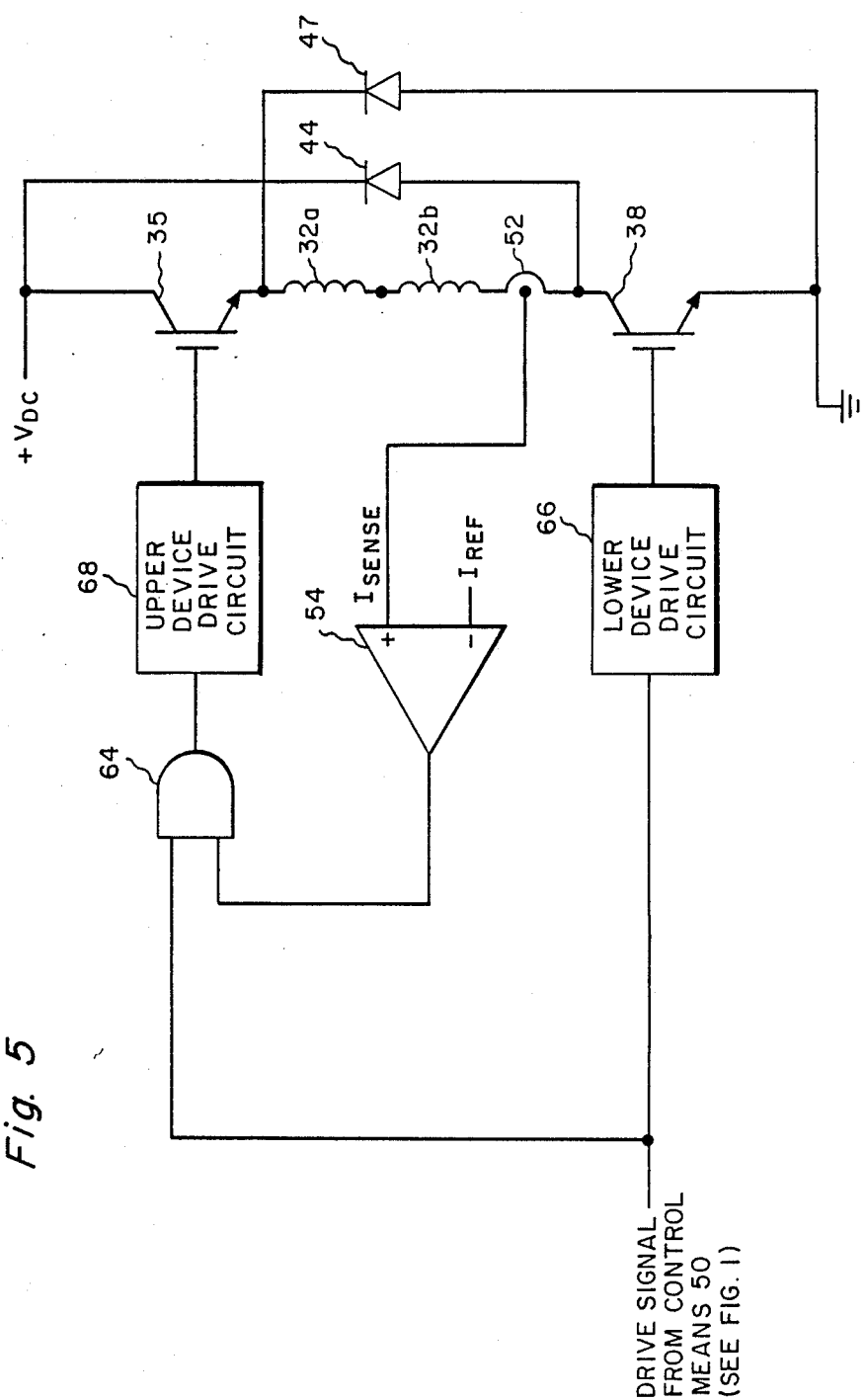
FIG. 5 is a schematic diagram of an alternative embodiment of the control system of the present invention.

Advantageously, by alternating chopping between switching devices of each respective machine phase during the conduction intervals thereof, the conduction and switching losses are balanced between these devices. Power dissipation, therefore, is likewise shared. However, in accordance with an alternative embodiment of the present invention, only one of the switching devices is used for current chopping. By way of example, as shown in FIG. 5, upper switching device 35 is the chopping device, while lower switching device 38 remains on throughout each conduction interval of the respective machine phase. During the conduction interval of the respective machine phase, when current $I_{SENSE}$ exceeds the upper limit of the hysteresis band, the output signal of comparator 54 is a low logic level, thus disabling AND gate 64 and turning off upper switching device 35. However, since the drive signal from control means 50 to lower device drive circuit 66 is a high logic level signal during the conduction interval of the respective machine phase, lower switching device 38 remains on. Phase current, therefore, circulates in the path provided by lower switching device 38 and flyback diode 47. The upper switching device is again turned on when current $I_{SENSE}$ decreases below the lower hysteresis band limit. This process repeats with upper switching device 35 chopping and lower switching device 38 remaining on throughout each conduction interval.

By using the current chopping strategy of the present invention, switching frequency is advantageously reduced. This is the result of phase current circulating through the conducting switching device and corresponding flyback diode, while the chopping device is nonconductive. In particular, in a conventional chopping scheme, when both switches are turned off, current is returned to the DC source via flyback diodes. This effectively results in a voltage $-V_{DC}$ across the phase winding, causing current to decrease rapidly. By way of contrast, with current circulating according to the present invention, current is not returned to the DC source, and the effective voltage drop across the phase winding is the sum of the voltage drops across the conducting switching device and the corresponding flyback diode. Since this effective voltage drop is small compared with voltage $-V_{DC}$, the circulating current decreases more slowly, thereby decreasing the chopping frequency. A lower chopping frequency results in lower switching losses and hence lower device junction temperatures.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A control for a bridge inverter for driving a multiphase switched reluctance machine, said bridge inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, respectively, the series combination of said upper and lower switching devices and said machine phase winding being adapted to be connected across an external DC source, said control comprising:

a plurality of current sensing means, each respective one of said current sensing means being coupled to the corresponding inverter phase leg for producing a sense current representative of instantaneous phase current therethrough;

commanded reference waveform generating means for providing a reference current waveform;

a plurality of comparator means, each respective one of said comparator means being coupled to the corresponding current sensing means for comparing the respective sense current with said reference current waveform so as to generate a first logic level signal when the respective sense current exceeds said reference current waveform by a first predetermined amount and a second logic level signal when the respective sense current is less than said reference current waveform by a second predetermined amount;

a plurality of first drive means, each respective one of said first drive means being coupled to the lower switching device of the corresponding phase leg for driving said lower switching device during each conduction interval thereof; and a plurality of second drive means, each respective one of said second drive means being coupled to the upper switching device of the corresponding phase leg for turning off said upper switching device of the corresponding phase leg whenever the respective sense current exceeds said reference current waveform by said first predetermined amount so as to allow the respective phase current to circulate through the respective machine phase winding while said upper switching device is nonconductive, and for turning back on said upper switching device of the corresponding phase leg during the conduction interval thereof when the respective phase current has decreased to a level where the respective sense current is less than said reference current waveform by said second predetermined amount.

2. The control of claim 1 wherein each respective one of said second drive means comprises logic circuit means for generating a high logic level signal for turning on said upper switching device of the corresponding phase leg and for generating a low logic level signal for turning off said upper switching device of the corresponding phase leg.

3. The control of claim 2 wherein each of said logic circuit means comprises an AND gate coupled to a corresponding one of said comparator means, respectively.

4. The control of claim 1 wherein said upper and lower switching devices each comprise a bipolar junction transistor.

5. A control for a bridge inverter for driving a multiphase switched reluctance machine, said bridge inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, the series combination of said upper and lower switching devices and said machine phase winding being adapted to be connected across an external DC source, said control comprising:

a plurality of current sensing means, each respective one of said current sensing means being coupled to the corresponding inverter phase leg for producing a sense current representative of instantaneous phase current therethrough;

commanded reference waveform generating means for providing a reference current waveform;

a plurality of comparator means, each respective one of said comparator means being coupled to the corresponding current sensing means for comparing the respective sense current with said reference current waveform so as to generate a first logic level signal when the respective sense current exceeds said reference current waveform by a first predetermined amount and a second logic level signal when the respective sense current is less than said reference current waveform by a second predetermined amount;

a plurality of flip-flop means, each respective one of said flip-flop means being responsive to a corresponding one of said comparator means, respectively, so as to change state whenever the output signal of said corresponding comparator means transitions from said first logic level to said second logic level;

a plurality of drive means, each respective one of said drive means being responsive to a respective one of said flip-flop means for alternately turning off and on said upper and lower switching devices of the corresponding phase leg during each conduction interval of the corresponding phase leg, said drive means for each respective phase turning off one of said switching devices of the corresponding phase leg whenever the respective sense current exceeds said reference current waveform by said first predetermined amount so as to allow the respective phase current to circulate through the respective machine phase winding while said one of said switching devices is nonconductive, and for turning back on said one of said switching devices, respectively, when the respective sense current decreases to a level where the respective sense current is less than said reference current waveform by said second predetermined amount.

6. The control of claim 5 wherein said drive means comprises logic circuit means for alternately generating high and low logic level signals to alternately turn on and off, respectively, said upper and lower switching devices.

7. The control of claim 6 wherein each of said logic circuit means comprises:
 an inverter coupled to the output of a corresponding one of the comparator means;
 an upper NAND gate coupled to the output of said inverter and to a corresponding one of said flip-flop means;
 a lower NAND gate coupled to the output of said inverter and to the other output of the corresponding one of said flip-flop means;
 an upper AND gate responsive to said upper NAND gate and coupled to said upper switching device of the corresponding phase leg; and
 a lower AND gate responsive to said lower NAND gate and coupled to said lower switching device of the corresponding phase leg.

8. The control of claim 5 wherein said upper and lower switching devices each comprise an insulated gate bipolar transistor.

9. A method for controlling a bridge inverter for driving a multiphase switched reluctance machine, said inverter comprising a plurality of phase legs, each of said phase legs comprising an upper switching device and a lower switching device both connected in series with a machine phase winding of said switched reluctance machine, each of said phase legs further comprising an upper flyback diode coupled in parallel with the series combination of said upper switching device and said machine phase winding and a lower flyback diode coupled in parallel with the series combination of said lower switching device and said machine phase winding, the series combination of said upper and lower switching devices and said machine phase winding being adapted to be connected across an external DC source, said method comprising the steps of:
 (a) sensing instantaneous phase current in each respective phase leg of said inverter;
 (b) comparing a proportional representation of the respective phase current to a reference current waveform;
 (c) turning on said upper and lower switching devices of the corresponding phase when the proportional representation of the respective phase current is less than said reference current waveform by a first predetermined amount;
 (d) repeating steps (a) and (b);
 (e) turning off a preselected one of said switching devices when the proportional representation of the respective phase current exceeds said reference current waveform by a second predetermined amount;
 (f) repeating steps (a) and (b);
 (g) turning back on said preselected one of said switching devices when the proportional representation of the respective phase current is less than said reference current waveform by said first predetermined amount; and
 (h) repeating the steps of said method continuously.

10. A method for controlling a bridge inverter for driving a multiphase switched reluctance machine, said inverter comprising a plurality of phase legs, each of said phase legs comprising an upper switching device and a lower switching device both connected in series with a machine phase winding at said switched reluctance machine, each of said phase legs further comprising an upper flyback diode coupled in parallel with the series combination of said upper switching device and said machine phase winding and a lower flyback diode coupled in parallel with the series combination of said lower switching devices and said machine phase winding, the series combination of said upper and lower switching devices and said machine phase winding being adapted to be connected across an external DC source, said method comprising the steps of:
 (a) sensing instantaneous phase current in each respective phase leg of said inverter;
 (b) comparing a proportional representation of the the respective phase current to a reference current waveform;
 (c) turning on said upper and lower switching devices of the corresponding phase when the proportional representation of the respective phase current is less than said reference current waveform by a first predetermined amount;
 (d) repeating steps (a) and (b);
 (e) turning off a first preselected one of said switching devices when the proportional representation of the respective phase current exceeds said reference current waveform by a second predetermined amount;
 (f) repeating steps (a) and (b);
 (g) turning on said first preselected one of said switching devices when the proportional representation of the respective phase current is less than said reference current waveform by said first predetermined amount;
 (h) repeating steps (a) and (b);
 (i) turning off a second preselected one of said switching devices when the proportional representation of the respective phase current exceeds said reference current waveform by said second predetermined amount;
 (j) repeating steps (a) and (b);
 (k) turning on said second preselected one of said switching devices when the proportional representation of the respective phase current is less than said reference current waveform by said first predetermined amount;
 (l) repeating the steps of said method continuously.

* * * * *